United States Patent
Ryu et al.

[11] Patent Number: 5,989,327
[45] Date of Patent: Nov. 23, 1999

[54] INK COMPOSITION FOR INK-JET PRINTER

[75] Inventors: Seung-min Ryu, Kunpo; Seong-jin Kim, Sungnam, both of Rep. of Korea

[73] Assignee: Samsung Electronics Co., Ltd., Suwon, Rep. of Korea

[21] Appl. No.: 08/995,856

[22] Filed: Dec. 22, 1997

[30] Foreign Application Priority Data

Dec. 20, 1996 [KR] Rep. of Korea ............ 96-69328
Dec. 28, 1996 [KR] Rep. of Korea ............ 96-75354
Dec. 17, 1997 [KR] Rep. of Korea ............ 97-69975

[51] Int. Cl.$^6$ .................................................. C09D 11/02
[52] U.S. Cl. ................................. 106/31.85; 106/31.75; 106/31.8; 106/31.86; 106/31.87; 106/31.88
[58] Field of Search .............. 106/31.85, 31.86, 106/31.87, 31.88, 31.75, 31.8

[56] References Cited

U.S. PATENT DOCUMENTS

| | | | |
|---|---|---|---|
| 4,004,939 | 1/1977 | O'Brien et al. | 106/135 |
| 4,155,435 | 5/1979 | O'Brien et al. | 560/151 |
| 5,085,698 | 2/1992 | Ma et al. | 106/31.85 |
| 5,221,334 | 6/1993 | Ma et al. | 106/31.85 |
| 5,519,085 | 5/1996 | Ma et al. | 106/31.85 |
| 5,571,850 | 11/1996 | Ma et al. | 106/31.85 |
| 5,713,993 | 2/1998 | Grezzo Page et al. | 106/31.85 |

FOREIGN PATENT DOCUMENTS 518 225   12/1992   European Pat. Off. .

OTHER PUBLICATIONS

Database WPI, Section Ch, Week 9540, Derwent Pubs. Ltd., London, GB; AN 95–309315 XP002060098, & JP 07 207 178 A (Dainichiseika Color & Chem Mfg), Aug. 1995, Abstract only.

*Primary Examiner*—Helene Klemanski
*Attorney, Agent, or Firm*—Foley & Lardner

[57] ABSTRACT

An ink composition for an ink jet printer. The ink composition contains an oligomeric dispersant, a pigment and a solvent. The oligomeric dispersant simultaneously has a hydrophilic group capable of interacting with water soluble solvent and an anchoring group capable of interacting with the pigment. The ink composition has good printing properties, water fastness, light fastness and storage stability.

10 Claims, No Drawings

INK COMPOSITION FOR INK-JET PRINTER

BACKGROUND OF THE INVENTION

1. Field of the Invention

The present invention relates to an ink composition for an ink-jet printer, and more particularly, to a water soluble ink composition adopting a pigment as a coloring agent used in an ink jet printer, which is improved in properties such as water fastness, light fastness and storage stability, and which can be easily manufactured.

2. Description of the Related Art

Ink jet printing is most commonly performed by a thermal bubble ink jet printing or a piezoelectric bubble ink jet printing method.

According to the thermal bubble ink jet method, when ink is heated to above its boiling point by a heating unit of the print head, bubbles are generated. The bubbles are then grown to form larger bubbles. When such larger bubbles are formed, pressure is applied to the surrounding ink, and printing is achieved while the ink is discharged through an ink discharge hole due to the pressure.

In the piezoelectric bubble ink jet printing method, when a voltage is applied to a piezoelectric unit, a change in ink volume is effected. Pressure is generated by the change in ink volume, and this pressure as applied to the ink. Printing is achieved while the ink is discharged through an ink discharging hole due to the pressure.

An ink composition for an ink jet printer is composed of a coloring agent such as a dye or a pigment, water, and additives such as an absorbent. When a dye is used as a coloring agent, it is difficult to select a dye to be printed in a desired color, and the resultant ink has a limitation in use due to its poor water fastness and light fastness. When a pigment is used as a coloring agent, water fastness and the light fastness are improved as compared to when a dye is used.

When an ink composition is made using a pigment as the coloring agent, pigment particles tend to aggregate hydrophilically due to the van der Waals' force during a drying process. Such aggregation of pigment particles may block the nozzle or discharge holes of a printer head. Thus, it is very important to pre-grind the pigment in order to avoid such a phenomenon. Generally, as the particle size of the pigment particles is decreased, color strength, glossiness, brightness and transparency improve. That is, print resolution is enhanced.

However, even when the pigment agglomerate is ground, the ground pigment particles tend to aggregate again. Thus, it is necessary to perform a dispersion process for preventing reaggregation of the ground particles by minimizing the total surface energy. The pigment after the dispersion process can be stabilized by electrical stabilization, steric stabilization using a stabilizing agent, or electro-steric stabilization. Also, in the case of dispersing the pigment, the steric stabilization method has been commonly adopted since steric stabilization is affected less by electrolytes than the electric stabilization which is affected by whether or not the electrolytes are contained in a dispersion medium.

Conventionally, a polymeric dispersing agent has been used as a dispersing agent. The polymeric dispersing agent is a copolymer having both hydrophilic and hydrophobic groups, wherein the hydrophobic group stabilizes the dispersion of the pigment by an interaction with the pigment, and the hydrophilic group interacts with a water soluble solvent to provide steric stability.

However, due to its high large molecular weight, physical properties (e.g., viscosity) of the ink composition changes considerably even if the change in the amount of polymeric dispersing agent added is small. Thus, it is very difficult to accurately control the amount of dispersing agent during the manufacture of the ink composition. Also, even if the polymeric dispersing agent contains hydrophilic groups, mole fraction of the hydrophilic group to the whole compound is low, so that its solubility in water is poor. Thus, it takes a long time to dissolve the polymeric dispersing agent in water. Also, when water of the ink composition near a nozzle evaporates, the polymer is precipitated due to its lower solubility in water, thereby blocking the nozzle. In order to prevent such an undesirable phenomenon, a wetting agent is necessary. However, using a wetting agent extends the amount of time required to dry the ink on paper.

SUMMARY OF THE INVENTION

To solve the above problems, it is an object of the present invention to provide an ink composition for an ink jet printer, which can be manufactured easily and which is improved in properties such as light fastness, water fastness to bleeding in water, and storing properties.

To achieve the above object, there is provided an ink composition for an ink jet printer, comprising a coloring agent, a dispersing agent and a solvent, wherein the coloring agent is a pigment and the dispersing agent is an AB type (including A and B portions) oligomer, and wherein the A portion represents an anchoring group interacting with the pigment without a repeating unit, the anchoring group being selected from the group consisting of hydrogen, unsubstituted or substituted $C_1 \sim C_{30}$ aliphatic hydrocarbon group with at least one substituent (G), unsubstituted or substituted $C_1 \sim C_{30}$ heteroaliphatic hydrocarbon group with at least one substituent (G) (here, the heteroaliphatic hydrocarbon group refers to an aliphatic hydrocarbon containing a heteroatom), unsubstituted or substituted sugars with at least one substituent (G), unsubstituted or substituted sorbitan with at least one substituent (G), unsubstituted or substituted $C_6 \sim C_{50}$ aromatic hydrocarbon group with at least one substituent (G), and unsubstituted or substituted steroids with at least one substituent (G), and the B portion represents a hydrophilic group having a repeating unit, the hydrophilic group being represented by the following formula 1:

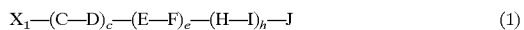

$$X_1-(C-D)_c-(E-F)_e-(H-I)_h-J \quad (1)$$

where C, E and H are independently selected from the same group to which the A portion belongs; $X_1$, D, F and I are independently selected from the group consisting of aliphatic hydrocarbon, aromatic hydrocarbon, —N—, —NH—, —NH$_2$—, —O—, —S—, —O—O—, —S—S—, —C(O)—, —C(S)—, —C(O)—C(O)—, —C(O)—O—, —O—C(O)—, —C(NH)—, —N—C(O)—, —C(O)—N—, —O—C(O)—O—, —N—C(O)—N—, —O—C(O)—N—, —N—C(O)—O—, —O—C(O)—C(O)—O—, —S(O)—, —S(O)(O)—, —S(O)—O—, —O—S(O)—, —S(O)(O)—O—, —O—S(O)(O)—, —S(O)—N—, —N—S(O)—, —S(O)(O)—N—, —N—S(O)(O)—, —O—S(O)—O—, —O—S(O)(O)—O—, —N—S(O)—N—, —N—S(O)(O)—N—, —O—S(O)—N—, —N—S(O)(O)—O—, —O—S(O)(O)—N—, —N—S(O)(O)—O—, —O—S(O)—S(O)—O—, —O—S(O)(O)—S(O)(O)—O—, —N—S(O)—S(O)—N—, —N—S(O)(O)—S—(O)(O)—N—, —P—, —P(O)(OH)—, —O—P(O)(OH)—P(O)(OH)—O—, —O—P(O)(OH)—P(O)(OH)—P(O)(OH)—O—, —O—P(O)(OH)—O—P(O)(OH)—O—P(O)(OH)—O— and NH$_4$OH; J is hydrogen or selected from the group consisting of aliphatic hydrocarbon group substituted by —OH, —SH, polyol, amine, ammonium hydroxide, ammonium halide, acidic group or alkali salt of the acid, heteroaliphatic hydrocarbon group substituted by —OH, —SH, polyol, amine, ammonium halide, ammonium hydroxide, acidic group or alkali salt of the acid and aromatic hydrocarbon group substituted by —OH, —SH, polyol, amine, ammonium hydroxide, ammonium halide, acidic group or alkali salt of the acid; and the following conditions are satisfied:

$$0 \leq c \leq 30,\ 0 \leq e \leq 30,\ 0 \leq h \leq 30 \text{ and } 0 < c + e + h < 60,$$

wherein the molecular weight of the oligomer is 300~3,000, and the substituent group (G) of the A portion is at least one selected from the group consisting of unsubstituted or substituted $C_1$~$C_{20}$ aliphatic hydrocarbon group with oxy group, amino group or thio group, unsubstituted or substituted $C_1$~$C_{20}$ heteroaliphatic hydrocarbon group with oxy group, amino group, or thio group, unsubstituted or substituted $C_6$~$C_{50}$ aromatic hydrocarbon group with oxy group, amino group or thio group, halide, —OH, —O—, —SH—, —S—, —CN, —SCN, —NO$_2$, —NH$_2$, —NH—, —N—, ammonium hydroxide, ammonium halide, —C=NH, —C=N—, amidino group, —N=NH, —N=N—, hydrazone, substituted hydrazone, amide group, substituted amide group, carboxyl group (—COOH), alkali salt of carboxylic acid (COO$^-$M$^+$), sulfonic acid (SO$_3$H), alkali salt of the sulfonic acid (SO$_3^-$M$^+$), phosphoric acid (H$_3$PO$_4$) and alkali salt of the phosphoric acid (H$_2$PO$_4^-$M$^+$), where M is an alkali metal.

Preferably, the A portion of the dispersant is selected from the group consisting of unsubstituted or substituted $C_6$~$C_{18}$ aliphatic alkyl group with at least one substituent (G), and unsubstituted or substituted $C_6$~$C_{18}$ aromatic alkyl group with at least one substituent (G), and the B portion is ethyleneglycol having a heteroatom.

DESCRIPTION OF THE PREFERRED EMBODIMENTS

In an ink composition according to the present invention, a pigment is stably dispersed in a solvent by an oligomeric dispersant having an anchoring group (A portion) and a hydrophilic group (B portion). In the polymeric dispersant, the anchoring group improves reactivity, e.g., chemical affinity, with the pigment. In order to increase adsorption of the dispersant, a substituent such as an acidic or alkali group, thiol group, cyano group, isocyano group and nitride may be introduced to the anchoring group.

Also, when a heteroatomic component exists in the B portion coupled with the A portion, synthesis of the oligomer is made easily. Lone pair electrons of a heteroatom of the B portion makes the steric structure of the A portion suitable for an interaction with the pigment, and directly reacts with the pigment particles, so that the dispersion of the pigment becomes easier.

The above-described oligomer having the anchoring and the hydrophilic groups can be formed by the following two methods.

First, a hydrophilic group and an anchoring group can be simultaneously introduced into an oligomer through a substitution reaction between an oligomer having the hydrophilic group and a compound having the anchoring group.

Second, after reacting a compound having an anchoring group with a compound having a hydrophilic group, the resultant product is polymerized, resulting in an oligomer.

The oligomer dispersant obtained by the above methods is easily dissolved in water, thereby making the dispersion of pigment easy.

As a result, due to the even dispersion of pigment, precipitation of the oligomer dispersant according to the evaporation of the water is sharply decreased, unlike the polymeric dispersant which is easily precipitated at the nozzle when the water of the ink composition is evaporated. When using such an oligomer dispersant, blockage of the nozzle is sharply decreased, and the whole structure of the pigment having the dispersant is simplified as the size of the dispersant attached to the pigment is relatively small. Thus, the flow of pigment ink within a printer head becomes easy, so that high speed printing can be achieved.

In order to improve the dispersion effect of the oligomer dispersant, two or more dispersants can be used according to the pigment.

Preferably, the molecular weight of the oligomer dispersant is 300~3,000, and the content of the oligomer dispersant is 0.1~20 wt % based on the total weight of the ink composition, preferably, 0.5~15 wt %.

An inorganic pigment and an organic pigment are used as a coloring agent. The particle size of the pigment affects the stability of dispersion, color strength and glossiness of the ink. Thus, it is preferable that the size of the pigment particles is small enough to pass through a nozzle having a diameter of between about 10~50 μm.

Preferably, the content of the pigment is 0.1~20 wt % based on the total weight of the ink composition, and more preferably, 0.5~15 wt %. Preferably, the pigment is selected from compounds having a functional group capable of actively reacting with the anchoring group of the dispersant.

The ink composition of the present invention may further include an acid or a base. Here, the acid or base increases the solubility of the oligomeric dispersant and stabilizes the dispersed pigment. The content of the acid or base is between about 0.1~20 wt % based on the weight of the dispersant.

There is no particular limitation in the kind of acid. Preferably, the acid is selected from the group consisting of $C_1$~$C_{30}$ aliphatic hydrocarbon carboxylic acid, $C_1$~$C_{30}$ heteroaliphatic hydrocarbon carboxylic acid, $C_6$~$C_{50}$ aromatic hydrocarbon carboxylic acid, $C_1$~$C_{30}$ aliphatic hydrocarbon sulfonic acid, $C_1$~$C_{30}$ heteroaliphatic hydrocarbon sulfonic acid, $C_6$~$C_{50}$ aromatic hydrocarbon sulfonic acid, $C_1$~$C_{30}$ aliphatic hydrocarbon phosphoric acid, $C_1$~$C_{30}$ heteroaliphatic hydrocarbon phosphoric acid, $C_6$~$C_{50}$ aromatic hydrocarbon phosphoric acid or sulfuric acid.

Also, there is no limitation in the kind of base. Preferably, the base is selected from the group consisting of $C_1$~$C_{30}$ aliphatic hydrocarbon amine, $C_6$~$C_{50}$ aromatic hydrocarbon amine, $C_1$~$C_{20}$ aliphatic mono-, di-, tri-, polyalkanol amine, and $C_6$~$C_{50}$ aromatic mono-, di-, tri-, polyalkanol amine. In detail, the base is one selected from the group consisting of dimethylethanol amine, methyldiethanol amine, RNH$_2$, R$_2$NH, R$_3$N (where R is selected from the group consisting of $C_1$~$C_{20}$ alkyl, CH$_2$OH and CH$_2$CH$_2$OH), ammonium hydroxide, tetralkylammonium hydroxide, dimethylaminoprolamine (DMAP), dimethylaminoprolpyl-2-pyrrolidone (DMAPP), laurylamine, cetrimonium bromide, morpholine and n-methylmorpholine.

The content of solvent is 60~99.8% based on the total weight of the ink composition. Here, water is mainly used as the solvent. If required, a mixture of water and organic solvent is used in order to improve the solubility of the oligomer dispersant and to appropriately control the viscosity and surface tension of the ink composition. Preferably, the content of organic solvent is 0.1~20 wt % based on the total weight of the solvent.

In the present invention, there is no limitation in the kind of organic solvent that may be used. Preferably, the organic solvent may be an alcohol such as methanol, ethanol, etc.; a polyhydric alcohol such as ethylene glycol, propylene glycol, etc.; tetrahydrofuran, dioxane; ethylene glycol monomethylethylether, diethylene glycol monomethylethyl ether, triethylene glycol monomethylpropylether, propylene glycol monomethylethylether, dipropylene glycol dimethyldiethylether; ethylacetate; ethylene carbonate; propylene glycol laurylate, ethylene glycol monomethylethylether acetate; diethylene glycol monomethylethyl ether acetate, propylene glycol monomethyl ethyl ether acetate, dipropyleneglycolmonomethylethylether acetate; lactone including γ-butylolactone; lactames including 2-pyrrolidone, N-pyrrolidone, N-(2-hydroxyethyl)pyrrolidone, N-methyl-2-pyrrolidone and 1,3-dimethyl-2-imidazolidinone; ketones including cellosolve, methylethylketone and acetone; a sulfur-containing organic solvent including sulfolane, dimethylsulfoxide and tetramethylene sulfone; or a carbohydrocarbon solvent selected from hexane, cyclohexane and toluene.

The ink composition according to the present invention is formed by the following method.

Water and an oligomeric dispersant are added to ink and mixed. If required, an organic solvent is added thereto. A pigment is then added to the mixture followed by dispersing, thereby preparing a high-concentrated ink composition. Physical properties of the composition, such as viscosity, surface tension, hue, lightness, etc., are appropriately controlled for the ink jet printer after diluting the high-concentrated ink composition.

Hereinafter, examples of the ink composition according to the present invention will be described. However, the present invention is not limited to the following examples.

Evaluation of the ink compositions manufactured by the following examples and comparative examples were performed as follows, and the results are shown in Table 2.

(1) Storage Stability

After putting 100 ml. of ink into a heat-resistant glass bottle, the glass bottle is sealed and then stored in an incubator at 60° C. for 2 months. Then, printing is performed using the ink. In Table 2, "○" represents good ejectability or no discoloration, and "x" represents poor ejectability of ink or discoloration.

(2) Optical Density (O.D.)

Optical density of the printed output is measured by using a reflectodensitometer. The average O.D. of yellow, cyan, magenta and black is graded as follows. In Table 2, "○" represents O.D. of 1.0 or higher., "Δ" represents O.D. of 0.9~1.0, and "x" represents O.D. of lower than 0.9.

(3) Bleeding

After preparing a printed output with two different color bars which are adjacent to each other, the number of occurrences of bleeding of each color is counted. Here, two colors are selected from black, yellow, cyan, magenta, red, green and blue. In Table 2, "○" represents the case without bleeding at the boundaries of each color bar, "Δ" represents the case where bleeding is shown at the boundaries of red, green and blue when an abundant amount of ink is used, and "x" represents the case where bleeding is shown at the boundaries of all color bars.

(4) Ejectability or Maintenance

Ink cartridges are left standing and idle for 6 hours, 4 days, 7 days and 30 days, respectively, and thereafter are tested to determine the smoothness of ejection of the ink. In Table 2, "○" represents good ejectability after 30 days, "Δ" represents blockage of nozzle after 7 days, "□" represents blockage of nozzle after 4 days, "◊" represents blockage of nozzle after 6 hours, and "x" represents immediate blockage of nozzle.

(5) Water Fastness

The degree of ink being diffused into water when a printed output is soaked in water is investigated. In Table 2, "○" represents less than 10% change of O.D., "Δ" represents 10~30% change in O.D., and "x" represents 30% or more change in O.D.

(6) Light Fastness

After leaving a printed output standing and idle under an ultraviolet (UV) lamp (about 254 nm), the degree of discoloration is observed. In Table 2, "○" represents less than 5% change in O.D., "Δ" represents 5~20% change in O.D., and "x" represents 20% or more change in O.D.

(7) Reliability of Printer Head

Using a microscope, it is determined whether or not kogation occurs on a printer head when 500 ml or more ink is used in one ink cartridge. In Table 2, "○" represents nonoccurrence of kogation, and "x" represents the occurrence of kogation.

EXAMPLE 1

A mixture including 7.00 wt % of 4-aminobutyl propylene glycol dodecyl ether, 5.00 wt % of methanol and 15.00 wt % of water, based on the total weight of the ink composition for an ink jet printer, was stirred for about 10 minutes to prepare an oligomeric dispersant solution.

5.00 wt % of anthraquinone (Red A2B: Ciba-Geigy), 17.00 wt % of ethylene glycol and 21.00 wt % of water, based on the weight of the ink composition for an ink jet printer, were added to the oligomeric dispersant solution and mixed thoroughly. The mixture was then diluted by adding 30.00 wt % of water.

The resultant composition was filtered and used as an ink composition for an ink jet printer.

EXAMPLE 2

2.00 wt % of ethyleneglycol-4-methoxy-1-naphthyl ether, 5.00 wt % of methanol and 15.50 wt % of water were added to 3.50 wt % of ethyleneglycol-4-methoxy-1-naphthyl ether and mixed for about 30 minutes to prepare an oligomeric dispersant solution.

5.50 wt % of carbon black (Special Black, Degussa), 4.50 wt % of carbowax, 15.00 wt % of ethyleneglycol and 19.00 wt % of water were added to the oligomeric dispersant solution, and then mixed. The resultant mixture was then diluted by adding 30.00 wt % of water.

The resultant composition was filtered and used as an ink composition for an ink jet printer.

EXAMPLE 3

2.50 wt % of cyclohexylene thioglycol biphenyl thioether, 5.00 wt % of methanol and 17.50 wt % of water were mixed for about 20 minutes to prepare an oligomeric dispersant solution.

5.00 wt % of phthalocyanine blue (ICI), 15.00 wt % of ethylene glycol and 25.00 wt % of water were added to the oligomeric dispersant solution and then mixed. The resultant mixture was then diluted by adding 30.00 wt % of water.

The resultant composition was filtered and used as an ink composition for an ink jet printer.

EXAMPLE 4

7.00 wt % of ethyleneglycol naphthyl ether sulfonate, 5.00 wt % of methanol, 13.00 wt % of water were mixed for about 15 minutes to prepare an oligomeric dispersant solution.

7.50 wt % of azomethione (Pigment yellow, BASF), 2.50 wt % of carbowax, 15.00 wt % of ethylene glycol and 20.00 wt % of water were added to the oligomeric dispersant solution, and then mixed. The resultant mixture was then diluted by adding 30.00 wt % of water.

The resultant composition was filtered and used as an ink composition for an ink jet printer.

EXAMPLE 5

4.50 wt % of ethyleneglycol benzene sulfonamide, 7.00 wt % of propanediol and 17.50 wt % of water were mixed for about 30 minutes to prepare an oligomeric dispersant solution.

5.00 wt % of Quindo Magenta (Mobay), 15.00 wt % of ethyleneglycol dimethylether and 20.00 wt % of water were added to the oligomer dispersant solution and then mixed. The resultant mixture was then diluted by adding 31.00 wt % of water.

The resultant composition was filtered and used as an ink composition for an ink jet printer.

EXAMPLE 6

3.5 wt % of propyleneglycol-co-ethyleneglycol naphthyl ether, 5.0 wt % of 1,4-buthanediol and 15.00 wt % of water were mixed for about 15 minutes to prepare an oligomeric dispersant solution.

5.00 wt % of Mansa Yellow X (Hochest), 17.00 wt % of ethylacetate, 2.00 wt % of carbowax and 22.00 wt % of water were added to the oligomeric dispersant solution, and then mixed. The resultant mixture was then diluted by adding 30.00 wt % of water.

The resultant composition was filtered and used as an ink composition for an ink jet printer.

EXAMPLE 7

4.00 wt % of aminobutylene glycol-1-imidazolepropyl ether, 7.00 wt % of glycerol and 18.00 wt % of water were mixed for about 30 minutes to prepare an oligomeric dispersant solution.

7.00 wt % of Heliogen Blue L6901F (BASF), 2.00 wt % of propyleneglycoldiprophyl ether, 15.00 wt % of propylene glycol and 17.00 wt % of water were added to the oligomeric dispersant solution. The resultant mixture was then diluted by adding 30.00 wt % of water.

The resultant composition was filtered and used as an ink composition for an ink jet printer.

EXAMPLE 8

4.20 wt % of propyloxy-polypropylene glycolyl 2-butylamine, 7.00 wt % of ethanol and 17.80 wt % of water were mixed for about 15 minutes to prepare an oligomeric dispersant solution.

5.00 wt % of Quindo Magenta (Mobay), 16.00 wt % of diethylene glycolmonoethylether and 20.00 wt % of water were added to the oligomeric dispersant solution and then mixed. The resultant mixture was then diluted by adding 30.00 wt % of water.

The resultant composition was filtered and used as an ink composition for an ink jet printer.

EXAMPLE 9

5.00 wt % of 1,4-butandiol and 12.50 wt % of water were added to 7.50 wt % of methylethylamino polybutylene glycol benzoic acid, and then mixed for 30 minutes to prepare an oligomeric dispersant solution.

6.50 wt % of carbon black (Raven 1170, Columbia Chemicals), 3.50 wt % of carbowax, 15.00 wt % of ethyleneglycol and 20.00 wt % of water were added to the oligomeric dispersant solution, and then mixed. The resultant mixture was then diluted by adding 30.00 wt % of water.

The resultant composition was filtered and used as an ink composition for an ink jet printer.

EXAMPLE 10

3.00 wt % of cyclohexylene thioglycol diethylamino propyl thioether, 2.00 wt % of glycosyl cyclohexylene glycol dibutylamine, 5.00 wt % of methanol and 15.00 wt % of water were mixed for about 20 minutes to prepare an oligomeric dispersant solution.

5.00 wt % of Haliogen blue L690F (BASF), 15.00 wt % of propylene glycol and 25.00 wt % of water were added to the oligomeric dispersant solution, and then mixed. The resultant mixture was then diluted by adding 30.00 wt % of water.

The resultant composition was filtered and used as an ink composition for an ink jet printer.

EXAMPLE 11

7.00 wt % of biphenylamino poly(phenylethylene thioglycolyl)2-phenylsulfuric acid, 4.00 wt % of ethanol and 14.00 wt % of water were mixed for 15 minutes to prepare an oligomeric dispersant solution.

7.50 wt % of Chromophtal Yellow 3G (Ciba-Geigy), 3.50 wt % of carbowax, 15.00 wt % of ethylene glycol and 19.00 wt % of water were added to the oligomeric dispersant solution, and then mixed. The resultant mixture was then diluted by adding 30.00 wt % of water.

The resultant composition was filtered and used as an ink composition for an ink jet printer.

COMPARATIVE EXAMPLE 1

8.00 wt % of a copolymer of methacrylic acid and n-butylacrylate [P(MAA/n-BA)](molecular weight=4500), 0.50 wt % of diethylamino ethanol (DMAE), 8.00 wt % of methanol and 13.00 wt % of water were mixed for about 15 minutes to prepare a polymeric dispersant solution.

5.00 wt % of azomethione (Pigment yellow, BASF), 2.50 wt % of carbowax, 15.00 wt % of ethylene glycol and 20.00 wt % of water were added to the polymeric dispersant solution, and then mixed. Then, the resultant mixture was diluted by adding 30.00 wt % of water.

The resultant composition was filtered and used as an ink composition for an ink jet printer.

COMPARATIVE EXAMPLE 2

7.00 wt % of P(MAA/n-BA)(molecular weight=5000), 0.50 wt % of DMAE, 8.00 wt % of methanol and 14.50 wt % of water were mixed for about 30 minutes to prepare a polymeric dispersant solution.

5.00 wt % of phthalocyanine blue (ICI), 15.00 wt % of ethylene glycol and 18.00 wt % of water were added to the polymeric dispersant solution. The resultant mixture was then diluted by adding 30.00 wt % of water.

The resultant composition was filtered and used as an ink composition for an ink jet printer.

COMPARATIVE EXAMPLE 3

8.00 wt % of P(MAA/n-BA)(molecular weight=9000), 0.50 wt % of DMAE, 8.00 wt % of ethanol and 13.50 wt % of water were mixed for about 15 minutes to prepare a polymeric dispersant solution.

5.00 wt % of azomethione (Pigment yellow, BASF), 14.00 wt % of ethyleneglycol, 2.00 wt % of carbowax and 19.00 wt % of water were added to the polymeric dispersant solution. The resultant mixture was then diluted by adding 30.00 wt % of water.

The resultant composition was filtered and used as an ink composition for an ink jet printer.

The pH, viscosity and surface tension of the ink compositions obtained by the Examples 1 through 11 and Comparative Examples 1 through 3 were measured, and the results were tabulated as shown in Table 1.

form the polymeric dispersant solution due to its low solubility. Moreover, it is very difficult to determine the optimum concentration range of the polymeric dispersant to a pigment, and the physical properties of the ink composition were very sensitive to change in concentration of the polymeric dispersant. Also, there were occurrences of separation of layers which are not shown in the cases using the oligomer dispersant, which makes it difficult to form the ink composition including the polymeric dispersant.

Storage stability, optical density, bleeding, ejectability, water fastness, light fastness and reliability of the printer head were tested on the ink compositions formed by Examples 1 through 11 and COMPARATIVE Examples 1 through 3, and the results are tabulated as shown in Table 2.

TABLE 2

| Class | Storage Stability | O.D. | Bleeding | Ejectability | Resistance to Bleeding in Water | Light Fastness | Reliability of Printer Head |
|---|---|---|---|---|---|---|---|
| Example 1 | ○ | ○ | ○ | ○ | ○ | ○ | ○ |
| Example 2 | ○ | ○ | ○ | ○ | ○ | ○ | ○ |
| Example 3 | ○ | ○ | ○ | ○ | ○ | ○ | ○ |
| Example 4 | ○ | ○ | ○ | ○ | ○ | ○ | ○ |
| Example 5 | ○ | ○ | ○ | ○ | ○ | ○ | ○ |
| Example 6 | ○ | ○ | ○ | ○ | ○ | ○ | ○ |
| Example 7 | ○ | ○ | ○ | ○ | ○ | ○ | ○ |
| Example 8 | ○ | ○ | ○ | ○ | ○ | ○ | ○ |
| Example 9 | ○ | ○ | ○ | ○ | ○ | ○ | ○ |
| Example 10 | ○ | ○ | ○ | ○ | ○ | ○ | ○ |
| Example 11 | ○ | ○ | ○ | ○ | ○ | ○ | ○ |
| Comparative Examnple 1 | x | Δ | x | x | ○ | ○ | x |
| Comparative Example 2 | x | x | Δ | x | ○ | ○ | Δ |
| Comparative Example 3 | Δ | x | Δ | x | ○ | ○ | x |

TABLE 1

| class | pH | viscosity (cp) | surface tension (dyne/cm) |
|---|---|---|---|
| Example 1 | 9.2 | 2.7 | 52 |
| Example 2 | 8.1 | 3.2 | 50 |
| Example 3 | 8.5 | 3.7 | 53 |
| Example 4 | 8.2 | 2.9 | 49 |
| Example 5 | 6.8 | 3.2 | 48 |
| Example 6 | 8.1 | 2.5 | 50 |
| Example 7 | 7.9 | 2.2 | 49 |
| Example 8 | 8.9 | 3.2 | 52 |
| Example 9 | 6.5 | 3.5 | 48 |
| Example 10 | 8.4 | 2.9 | 52 |
| Example 11 | 6.8 | 3.5 | 47 |
| Comparative Example 1 | 8.9 | 4.5 | 59 |
| Comparative Example 2 | 8.4 | 3.8 | 54 |
| Comparative Example 3 | 8.2 | 3.9 | 56 |

As can be seen from Table 1, the ink compositions of Examples 1 through 11 adopting an oligomeric dispersant do not show separation of layers as are shown in Comparative Examples 1 through 3. In addition, according to Examples 1 through 11, the change in physical properties such as viscosity is not sensitive to a change in the concentration of the dispersant, and therefore the determination of the concentration of the dispersant can be made over a wide range.

On the other hand, as seen from Comparative Examples 1 through 3 adopting a polymeric dispersant, it is difficult to As can be seen from Table 2, the ink compositions formed by Examples 1 through 11 adopting the oligomer dispersant are improvement in view of storage stability and optical density. Also, the number of occurrences of bleeding at the boundaries of each color bar was less, and the ejectability, light fastness and water fastness of the compositions obtained by Examples 1 through 11 were all good. In addition, kogation is rare even after using an abundant amount of ink.

On the other hand, the ink compositions obtained by Comparative Examples 1 through 3 were poor in view of optical density, ejectability and bleeding. Also, due to the separation of layers, the storage stability of the compositions was poor, and kogation was distinct.

In addition, the oligomeric dispersant according to the present invention can be easily manufactured when the B portion (hydrophilic group) includes a heteroatom capable of binding with the A portion (anchoring group). Also, such an oligomeric dispersant has good solubility in a solvent, and the physical properties of the ink composition barely changes according to the change in concentration of the oligomeric dispersant, so that the ink composition can be easily manufactured.

What is claimed is:

1. An ink composition for an ink jet printer, comprising a coloring agent, a dispersant and a solvent, wherein the coloring agent is a pigment and the dispersant is an AB type (including A and B portions) oligomer, the A portion represents an anchoring group interacting with the pigment without a repeating unit, the anchoring group being selected from the group consisting of hydrogen, unsubstituted or substituted $C_1 \sim C_{30}$ aliphatic hydrocarbon group with at least one substituent (G), unsubstituted or substituted $C_1 \sim C_{30}$ heteroaliphatic hydrocarbon group with at least one substituent (G), unsubstituted or substituted sugars with at least one substituent (G), unsubstituted or substituted sorbitan with at least one substituent (G), unsubstituted or substituted $C_6 \sim C_{50}$ aromatic hydrocarbon group with at least one substituent (G), and unsubstituted or substituted steroids with at least one substituent (G), and the B portion represents a hydrophilic group having a repeating unit, the hydrophilic group being represented by the following formula 1:

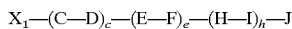

where C, E and H are independently selected from the same group to which the A portion belongs; $X_1$, D, F and I are independently selected from the group consisting of aliphatic hydrocarbon, aromatic hydrocarbon, —N—, —NH—, —NH$_2$—, —O—, —S—, —O—O—, —S—S—, —C(O)—, —C(S)—, —C(O)—C(O)—, —C(O)—O—, —O—C(O)—, —C(NH)—, —N—C(O)—, —C(O)—N—, —O—C(O)—O—, —N—C(O)—N—, —O—C(O)—N—, —N—C(O)—O—, —O—C(O)—C(O)—O—, —S(O)—, —S(O)(O)—, —S(O)—O—, —O—S(O)—, —S(O)(O)—O—, —O—S(O)(O)—, —S(O)—N—, —N—S(O)—, —S(O)(O)—N—, —N—S(O)(O)—, —O—S(O)—O—, —O—S(O)(O)—O—, —N—S(O)—N—, —N—S(O)(O)—N—, —O—S(O)—N—, —N—S(O)—O—, —O—S(O)(O)—N—, —N—S(O)(O)—O—, —O—S(O)—S(O)—O—, —O—S(O)(O)—S(O)(O)—O—, —N—S(O)—S(O)—N—, —N—S(O)(O)—S—(O)(O)—N—, —P—, —P(O)(OH)—, —O—P(O)(OH)—P(O)(OH)—O—, —O—P(O)(OH)—P(O)(OH)—P(O)(OH)—O—, —O—P(O)(OH)—O—P(O)(OH)—O—P(O)(OH)—O— and NH$_4$OH; J is hydrogen or selected from the group consisting of an aliphatic hydrocarbon group substituted by —OH, —SH, polyol, amine, ammonium hydroxide, ammonium halide, acidic group or alkali salt of the acid, heteroaliphatic hydrocarbon group substituted by —OH, —SH, polyol, amine, ammonium halide, ammonium hydroxide, acidic group or alkali salt of the acid and aromatic hydrocarbon group substituted by —OH, —SH, polyol, amine, ammonium hydroxide, ammonium halide, acidic group or alkali salt of the acid; and the following conditions are satisfied:

$0 \leq c \leq 30$, $0 \leq e \leq 30$, $0 \leq h \leq 30$ and $0 < c+e+h < 60$, wherein the molecular weight of the oligomer is 300~3,000, and the substituent group (G) of the A portion is at least one selected from the group consisting of a unsubstituted or substituted $C_1 \sim C_{20}$ aliphatic hydrocarbon group with oxy group, amino group or thio group, an unsubstituted or substituted $C_1 \sim C_{20}$ heteroaliphatic hydrocarbon group with oxy group, amino group, or thio group, unsubstituted or substituted $C_6 \sim C_{50}$ aromatic hydrocarbon group with oxy group, amino group or thiol group, halide, —OH, —O—, —SH—, —S—, —CN, —SCN, —NO$_2$, —NH$_2$, —NH—, —N—, ammonium hydroxide, ammonium halide, —C=NH, —C=N—, amidino group, —N=NH, —N=N—, hydrazone, substituted hydrazone, amide group, substituted amide group, carboxyl group (—COOH), alkali salt of carboxylic acid (COO$^-$M$^+$), sulfonic acid (SO$_3$H), alkali salt of the sulfonic acid (SO$_3^-$M$^+$), phosphoric acid (H$_3$PO$_4$) and alkali salt of the phosphoric acid (H$_2$PO$_4^-$M$^+$), where M is an alkali metal.

2. The ink composition of claim 1, wherein the A portion of the dispersant is selected from the group consisting of unsubstituted or substituted $C_6 \sim C_{18}$ aliphatic alkyl group with at least one substituent (G), and unsubstituted or substituted $C_6 \sim C_{18}$ aromatic alkyl group with at least one substituent (G), and the B portion is ethyleneglycol having a heteroatom.

3. The ink composition of claim 2, wherein the dispersant is selected from the group consisting of ethyleneglycol-4-methoxy-1-naphthyl ether, ethyleneglycol naphthyl ether sulfonate, ethyleneglycol benzene sulfonamide and propyleneglycol-co-ethyleneglycol naphthyl ether.

4. The ink composition of claim 1, wherein the content of the dispersant is 0.1~20 wt % based on the total weight of the ink composition.

5. The ink composition of claim 1, further comprising an acid or a base.

6. The ink composition of claim 5, wherein the content of the acid or base is 0.1~20 wt % based on the weight of the dispersant.

7. The ink composition of claim 1, wherein the content of the pigment is 0.1~20 wt % based on the total weight of the ink composition.

8. The ink composition of claim 1, wherein the content of the solvent is 60~99.8 wt % based on the total weight of the ink composition.

9. The ink composition of claim 1, wherein the solvent is water or a mixture of water and an organic solvent.

10. The ink composition of claim 9, wherein the content of the organic solvent is 0.1~20 wt % based on the total weight of the solvent.

* * * * *